United States Patent
Rangarajan et al.

(10) Patent No.: US 7,613,861 B2
(45) Date of Patent: Nov. 3, 2009

(54) SYSTEM AND METHOD OF OBTAINING ERROR DATA WITHIN AN INFORMATION HANDLING SYSTEM

(75) Inventors: Madhusudhan Rangarajan, Round Rock, TX (US); Mark W. Shutt, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 142 days.

(21) Appl. No.: 11/838,409

(22) Filed: Aug. 14, 2007

(65) Prior Publication Data

US 2009/0049221 A1    Feb. 19, 2009

(51) Int. Cl.
G06F 13/24    (2006.01)

(52) U.S. Cl. ............................... 710/268; 710/260
(58) Field of Classification Search ......... 710/268–269, 710/260

See application file for complete search history.

(56) References Cited

U.S. PATENT DOCUMENTS

| | | | |
|---|---|---|---|
| 6,453,278 B1 | 9/2002 | Favor et al. | |
| 6,463,492 B1 * | 10/2002 | Engfer et al. | 710/260 |
| RE38,927 E * | 12/2005 | Martwick | 710/269 |
| 7,200,701 B2 | 4/2007 | Stultz | |
| 7,447,943 B2 * | 11/2008 | Vu et al. | 714/42 |
| 2005/0086547 A1 | 4/2005 | Kobayashi et al. | |
| 2005/0102447 A1 | 5/2005 | Stultz | |
| 2006/0179199 A1 | 8/2006 | Stern et al. | |
| 2008/0040524 A1 * | 2/2008 | Zimmer et al. | 710/267 |

* cited by examiner

*Primary Examiner*—Clifford H Knoll
(74) *Attorney, Agent, or Firm*—Larson Newman & Able, LLP

(57) ABSTRACT

A system and method of obtaining error data within an information handling system is disclosed. According to one aspect, an interrupt handling system can include a first system management interrupt handler operable to initiate access to a first interrupt event message. The interrupt handling system can also include a first resource operable to generate the first interrupt event message. In one form, the first interrupt event message can identify a first interrupt event occurrence detectable by the first system management interrupt handler. The interrupt handling system can further include a memory including a first allocated memory location configured to store the first interrupt event message using the first system management interrupt handler. In one form, the first system management interrupt handler can be responsive to a second system management interrupt handler request to read the first interrupt event message.

20 Claims, 4 Drawing Sheets

SYSTEM AND METHOD OF OBTAINING ERROR DATA WITHIN AN INFORMATION HANDLING SYSTEM

FIELD OF THE DISCLOSURE

This disclosure relates generally to information handling systems, and more particularly to a system and method of obtaining error data within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

Some information handling systems can experience system level errors or events that can be processed or logged to be used at a different time to determine a cause of an event error. For example, some information handling systems can include a system management interrupt (SMI) handler that can detect system level errors and process, analyze, and/or store an event message. For example, a device or component can malfunction, or even be fatally flawed, and detected by an SMI handler. As such, the SMI handler can detect the operating condition and enable or disable use of the component, device, or system as desired. However, as the interoperability and diversity of information handling systems and components expand, processing of such event messages can degrade overall system performance.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
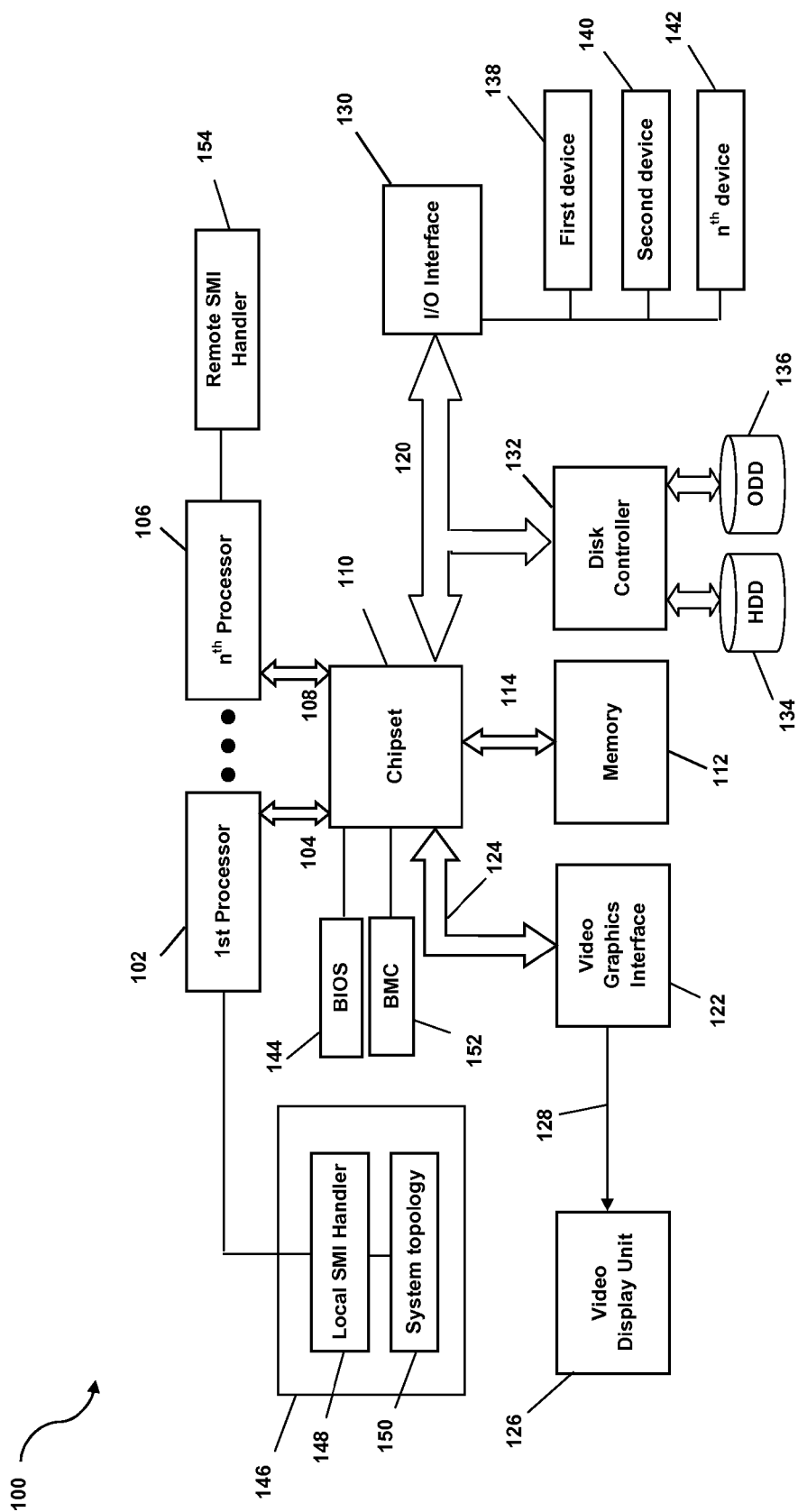
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of obtaining error data within an information handling system is disclosed. The method can include detecting a first interrupt event occurrence generated by a first remote resource using a local processor coupled to a first local memory. The method can also include initiating use of a first system management interrupt handling sequence using the local processor, and initiating use of a second system management interrupt handling sequence remote to the local processor. The method can further include enabling access to a first allocated memory location configured to store a plurality of interrupt event messages remote to the local processor. In one form, at least a portion of the first allocated memory location can be updated to include a first interrupt event message. According to a further aspect the second system management interrupt handling sequence can update the first allocated memory location prior to the first system management interrupt handling sequence completing.

According to another aspect of the disclosure, an interrupt handling system is disclosed. The interrupt handling system can include a first system management interrupt handler operable to initiate access to a first interrupt event message. The interrupt handling system can also include a first resource operable to generate the first interrupt event message. In one form, the first interrupt event message can identify a first interrupt event occurrence detectable by the first system management interrupt handler. The interrupt handling system can further include a memory including a first allocated memory location configured to store the first interrupt event message using the first system management interrupt handler. In one form, the first system management interrupt handler can be responsive to a second system management interrupt handler request to read the first interrupt event message.

According to a further aspect of the disclosure, an information handling system is disclosed. The information handling system can include a first processor operable to initiate an inquiry into a system management interrupt event. The information handling system can also include a remote system management interrupt handler responsive to the first processor and the system management interrupt event. According to one aspect, the remote system management interrupt handler can be operable to initiate a remote system management interrupt event inquiry to obtain a first interrupt event message identifying the system management interrupt event.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as physical processor 106 coupled to a second host bus 108. The first physical processor 102 can be coupled to a chipset 110 via the first host bus 104. Further, the n$^{th}$ physical processor 106 can be coupled to the chipset 110 via the second host bus 108. The first physical processor 102 can further be operable as a Bootstrap Processor (BSP) operable to initialize the information handling system 100 and to manage critical processes including error logging. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the n$^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the n$^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

According to one aspect, the I/O interface 130 can be coupled to a first device 138, as second device 140, up to an n$^{th}$ device 142. In one form, the I/O interface 130 can include a PCI enabled interface and one or more of each device 138, 140, 142 can be coupled to the PCI enabled interface operable to expand resources available to the information handling system 100. The information handling system 100 can also include a basic input output system (BIOS) 144 accessible to the first processor 102. The BIOS 144 can also include a BIOS memory 146 operable to store a local SMI handler 148 and a system topology 150. In one form, the system topology 150 can be used with the local SMI handler 148 to process system management interrupts of the information handling system 100 and associated components. For example, the system topology 150 can include device identifiers, addresses, allocated memory locations or buffers storing event messages or event logs, or any combination thereof.

In one form, the information handling system 100 can also include a base management controller (BMC) 152 coupled to a BIOS 140 and operable to be employed by the information handling system 100 via a bus, such as a low pin count (LPC) communication bus. One or more components or devices of the information handling system 100 can be coupled to the BMC 152 (not illustrated) to manage various aspects of the information handling system 100 and associated devices or components. The information handling system 100 can also include a remote SMI handler 154 coupled to a remote processor such as the $n^{th}$ processor 106. In one form, the nth processor 106, or other number or processors, can be provided as an application processor (AP).

During operation, the information handling system 100 can experience an SMI event, or other form of system level interrupt signal, that can be detected by the information handling system 100. For example, the local SMI event handler 148 can detect an SMI event and in one form, can initiate access to one or more devices or components that may have caused the SMI event. In one form, the SMI event handler 148 can be used by the first processor 102 to detect SMI events. According to a further aspect, the BIOS 144 can initiate use of the remote SMI handler 154 to initiate access to remote resources of the information handling system 100 to determine an source and event message in response to a detected SMI event.

According to one aspect, the system topology 150 can be used in association with the local SMI handler 148. For example, the local SMI handler 148 can access the system topology 150 to determine one or more devices, components, resources, etc. of the information handling system 100 in connection with processing an SMI event. In one form, the system topology 150 can include one or more memory locations, memory addresses of one or more memory device, buffer locations, device identifiers, or various other types of information that can be used to process an SMI event. For example, the system topology 150 can store a memory location associated with the remote SMI handler 154 operable to store SMI event data that can be obtained from, in one example, the first device 138. As such, the remote SMI handler 154 can obtain a copy of the SMI event data from the first device 138 and enable to the local SMI handler 148. In this manner, the local SMI handler 148 need not access one or more resources or devices that can be accessed by the remote SMI handler 154 to obtain SMI event data during an SMI event occurrence.

Figure 2:
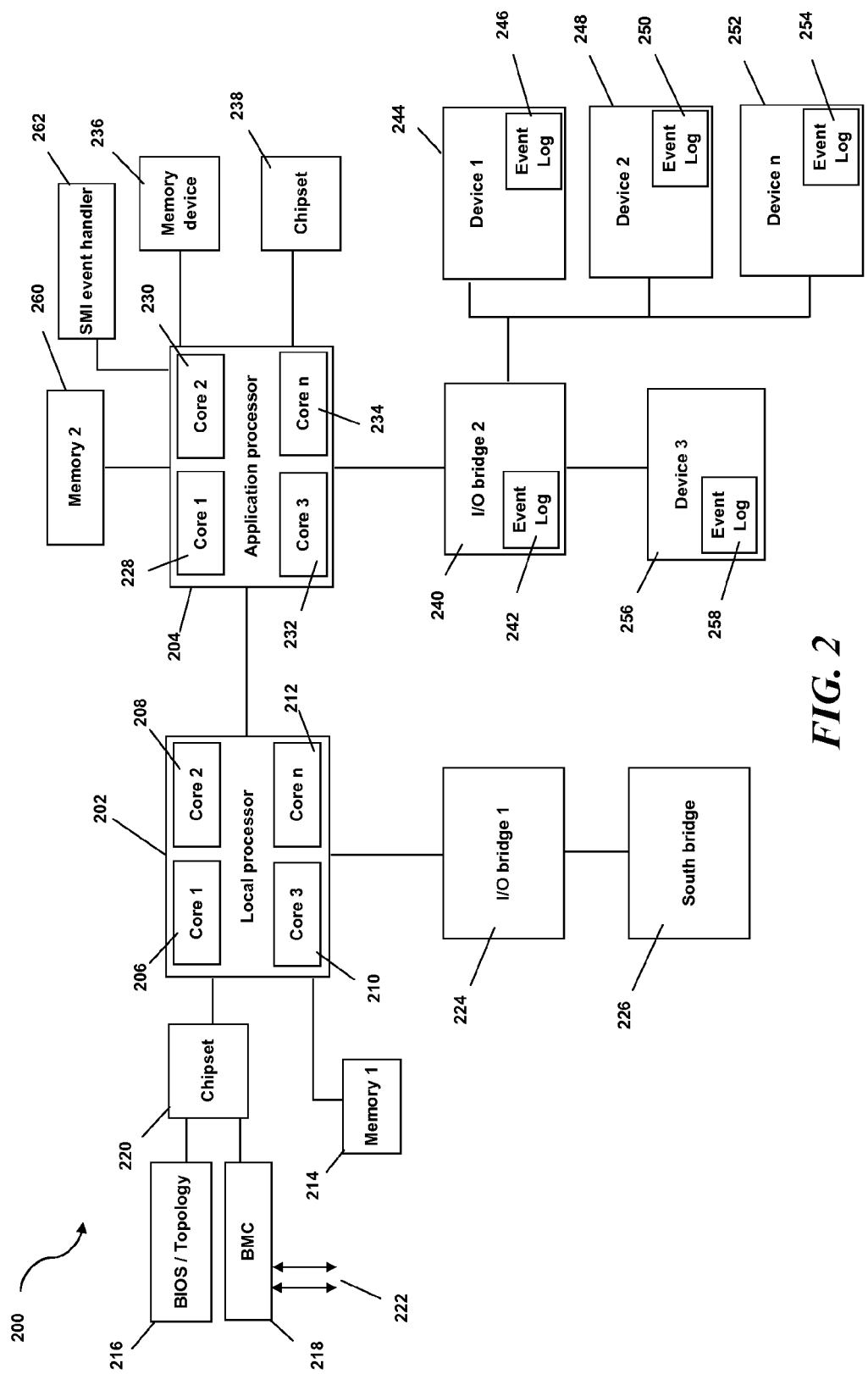
FIG. 2 illustrates a functional block diagram of an interrupt handling system according to one aspect of the disclosure.

FIG. 2 illustrates a functional block diagram of an interrupt handling system, illustrated generally at 200, according to one aspect of the disclosure. The interrupt handling system 200 can be employed, in whole or in part, by the information handling system 100 illustrated in FIG. 1, or any other system, device, component, etc. operable to employ portions, or all of, the interrupt handling system 200.

According to one aspect, the interrupt handling system 200 can include a local processor 202, and a remote processor operable as an application processor 204. In one form, the local processor 202 can be operable as a BSP operable to boot or initialize an information handling system. The local processor 202 operable as a BSP can further process critical functions including error logging. In one form, the local processor 202 can include one or more of a first core processor 206, a second core processor 208, a third core processor 210, an $n^{th}$ core processor 212, or any combination thereof. The local processor 202 can be coupled to a first memory 214, and a BIOS 216 including a system topology, and a BMC 218. The BIOS 216, the BMC 218, and local processor 202 can be coupled to a chipset 220. The BIOS 216 includes the system topology that can include configuration data of the interrupt handling system 200, and in one form, can include one or more memory addresses or references identifying memory locations processor resources, other resources, or any combination thereof, that can be used in association with SMI events, SMI event data, SMI messages, or any combination thereof. The local processor 202 can also be coupled to a first I/O bridge 224 operable to be coupled to one or more interfaces or I/O devices. According to one aspect, the first I/O bridge 224 can be coupled to a south bridge 226 and in some forms, can the south bridge 226 can be similar to the south bridge described in FIG. 1.

The interrupt handling system 200 can also include the application processor 204 that can include one or more of a first core processor 228, a second core processor 230, a third core processor 232, an $n^{th}$ core processor 234, or any combination thereof The application processor 204 can also be coupled to a second memory 260 operable to store one or more SMI event error data or messages. The second memory 260 can be integrated as a part of one or more of the processor cores 228, 230, 232, 234 or the application processor 204. The application processor 204 can also be coupled to a memory device 236 such as a single interface memory module (SIMM) or dual interface memory module (DIMM) and can further be coupled to a second chipset 238. In one form, one or more of the processors or processing cores can include an integrated memory controller (not illustrated) that can be coupled to one or more memory devices. Additionally, the memory device 236 and the second memory 260 can be realized as the same memory device or separate devices. The second chipset 238 can be used in association with the local processor 202, the application processor 204, or any combination thereof. In one form, the first chipset 220 and the second chipset 238 can be separate chipsets or can be combined.

In one form, the application processor 204 can also be coupled to a second I/O bridge 240 having an event log 242 operable to store SMI event data. The second I/O bridge 240 can be coupled to a first device 244 including a first device event log 246, a second device 248 including a second device event log 250, an $n^{th}$ device 252 including an $n^{th}$ device event log 254, or any combination thereof Each device 244, 248, 252 can be coupled to the same communication bus and can be used independent of each other. The second I/O bridge 240 can also be coupled to a third device 256 including a third device event log 258.

In another embodiment, the interrupt handling system 200 -can include, or be used in association with, the BMC 218 including an LPC interface 222. In one form, the BMC 218 can be used with, or replaced by, a trusted platform module (TPM), integrated management controller (IMC), or any combination thereof, operable to be used in association with SMI events. For example, the BMC 256 can include a service processor (SP) that can monitor operating states of the interrupt handling system 200 using the LPC 222. In one form, an SP can be used with the local processor 202. According to a further aspect, the application processor 204 can employ an SMI event handler 262 operable to process SMI events. In another form, the local processor 202 can employ a local SMI event handler (not illustrated) as desired.

During operation, the local processor 202 can detect a local or remote SMI event occurrence. For example, the SMI event can be initiated at a resource local to the local processor 206 or via a resource coupled to the application processor 204.

Upon detection of the SMI event, the local processor 202 can initiate an inquiry to obtain or read an SMI message, operating state, or various other types of error data in association with detecting the SMI event. In one form, the application processor 204 can be responsive to the SMI inquiry or detection of the local processor 202, and can employ an SMI event handler 262 operable to obtain SMI event data one or more device 244, 248, 252, chipset 256, memory device 236, coupled to the application processor 204. In another form, the application processor 204 can employ the SMI event handler 262, and can copy one or more event log to an allocated memory location of the second memory 260. As such, the application processor 204 and the local processor 202 can access the allocated memory location of the second memory 260 to obtain the SMI event data. In the manner, the local processor 202 need not access each device or component and can benefit from efficiently accessing an allocated memory locations to obtain SMI event data.

In one embodiment, the SMI event data can also be output to the BMC 256. For example, the SMI event handler 262 can initiate coupling an input to the BMC 256 be operable to receive an input via the LPC 222 such as an event log that can include error messages and other types of SMI event information. As such, an error log of the BMC 256 can be updated and, in one form, a message can be sent to a system administrator including updated error log. In this manner, the system administrator can take actions, as needed or desired, to rectify the SMI event or operating condition.

According to another aspect, the system topology 216 can be used to allocate error handling between one or more processors, processor cores, or any combination thereof. For example, one or more processors or processing cores can be combined as desired to processor errors or SMI event data upon detection of an SMI event. As such, if an increase in error handling detection or processing may be desired, a load balance of error handling processes can be employed using the system topology 216 and resources.

Figure 3:
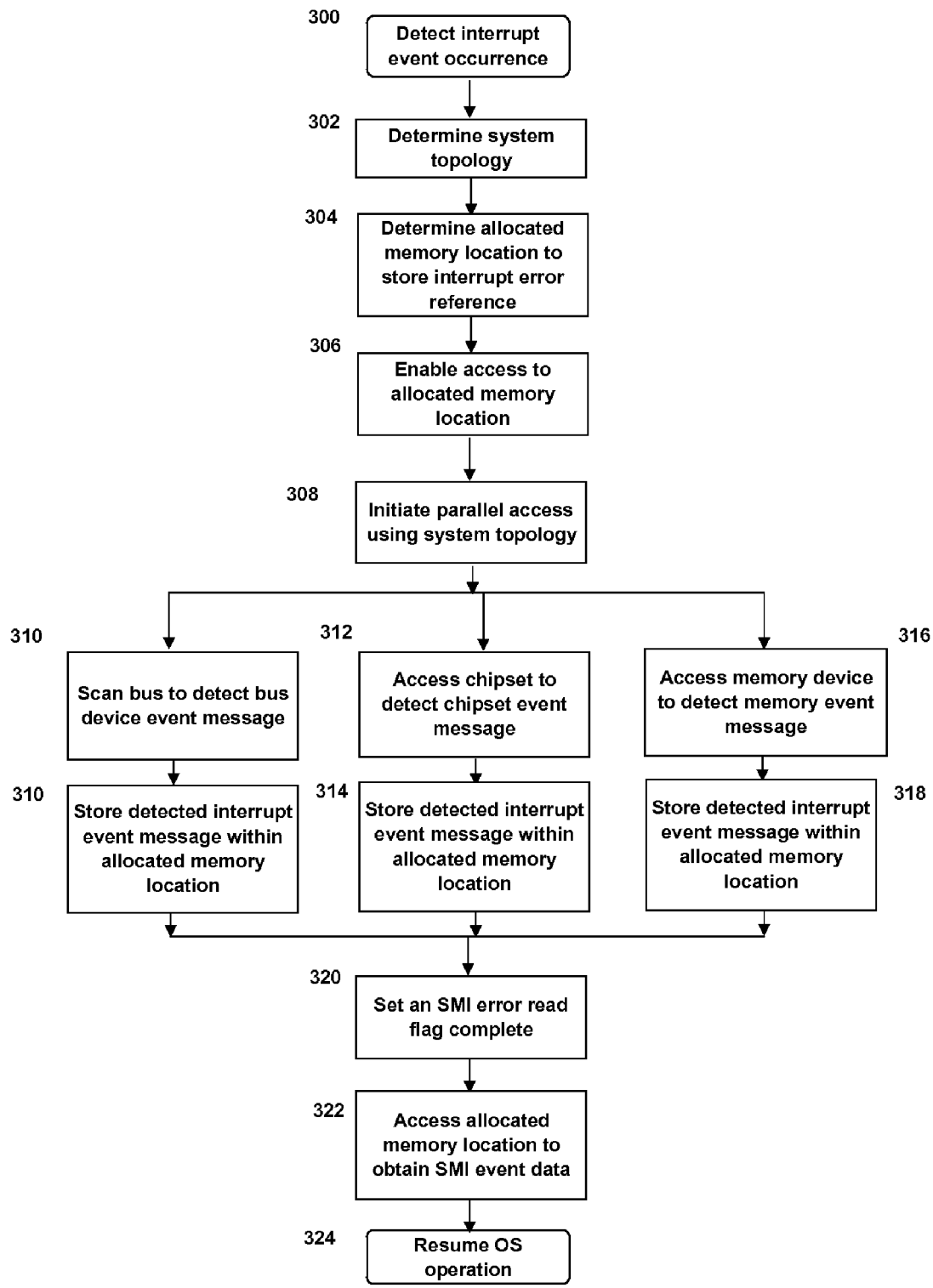
FIG. 3 illustrates a flow diagram of a method of processing interrupt event error data according to another aspect of the disclosure.

FIG. 3 illustrates a flow diagram of a method of processing interrupt event error data according to another aspect of the disclosure. FIG. 3 can be employed in whole, or in part, by the information handling system 100 depicted in FIG. 1, the interrupt handling system 200 described in FIG. 2, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

In various forms, the method can be used by a local processor, an application processor, one ore more processor cores, firmware, a device driver, or any combination thereof, operable to handle interrupt events. The method begins generally at 300 when an SMI event occurrence can be detected. For example, a local processor, remote processor, base management controller, service processor, or any combination of devices that can be used to detect an SMI event, can detect an SMI interrupt event. Upon detecting an SMI interrupt event has occurred, the method can proceed to block 302 and a system topology can be determined. For example, a system topology can be provided in association with a BIOS of an information handling system, and can be accessed. At block 304, one or more allocated memory locations configured to store SMI event data can be determined. For example, an allocated memory area can be remotely located to a local processor and can include, a memory buffer, memory device, or various other forms of accessible memory configured to store SMI event data. The method can then proceed to block 306, and access to the allocated memory locations can be enabled. For example, a read enable parameter can be set, an address of one or more allocated memory locations can be used, etc. At block 308, parallel access to one or more resources can be initiated to read SMI event data. For example, the system topology can be employed to determine one or more devices or components operable to output an SMI event. One or more locations, addresses, device identifiers, etc. can be used to initiate parallel access to the system topology.

As such, at block 308, parallel access to one or more device or component can be initiated. For example, the method can proceed to block 310, and a scan of a communication bus or I/O bus can be performed to detect one or more devices coupled to the communication bus. Additionally, if a device is located, the method can determine if an SMI event occurred with one or more devices coupled to the communication bus. If an SMI event message or data is detected at one or more of the devices, the SMI event message can be copied and stored within the allocated memory area at block 310. In one form, a memory buffer of the communication bus, an attached device, or any combination thereof can be accessed to copy and store SMI event messages. Upon storing the SMI event message or data within the allocated memory area, the method can proceed to block 320 as described below.

Similarly, at block 312 a chipset can be accessed to detect if a chipset initiated SMI event message or data may be available. For example, a chipset, such as chipset 110 illustrated in FIG. 1, chipset 234, illustrated in FIG. 2, or various other chipsets, can initiate an SMI event. If the chipset includes an SMI event entry, the chipset SMI event entry can be copied or stored within the allocated memory location. In one form, the chipset can include a memory device or buffer configured to store an event log including SMI event messages or data in connection with a chipset SMI event occurrence. Upon storing the SMI event message, the method can then proceed to block 320 as described below.

At block 316, the method can access one or more memory devices to detect if a memory initiated SMI event occurred. For example, a memory device, such as a SIMM, DIMM, or various other types of memory modules, can initiate an SMI event. If the memory device includes an SMI event entry, the memory SMI event entry can be copied or stored within the allocated memory location. In one form, one or more memory device or memory module can include a buffer configured to store an event log including SMI event messages or data in connection with a memory SMI event occurrence. Upon storing the SMI event message, the method can then proceed to block 320 as described below.

Upon accessing one more SMI event messages or data, the method can then proceed to block 320, and an SMI read flag can be set to indicate that access to each component or device has completed. In one form, a local processor can access the SMI error read flag of a remote processor to determine if the remote processor has completed reading SMI event messages or data. As such, the remote processor can set, and an SMI error read flag to indicate that an SMI read has been completed. The method can then proceed to block 322, and the allocated memory location can be accessed to obtain the SMI event messages or data. The method can then proceed to block 324 and the operating system can resume operation.

Figure 4:
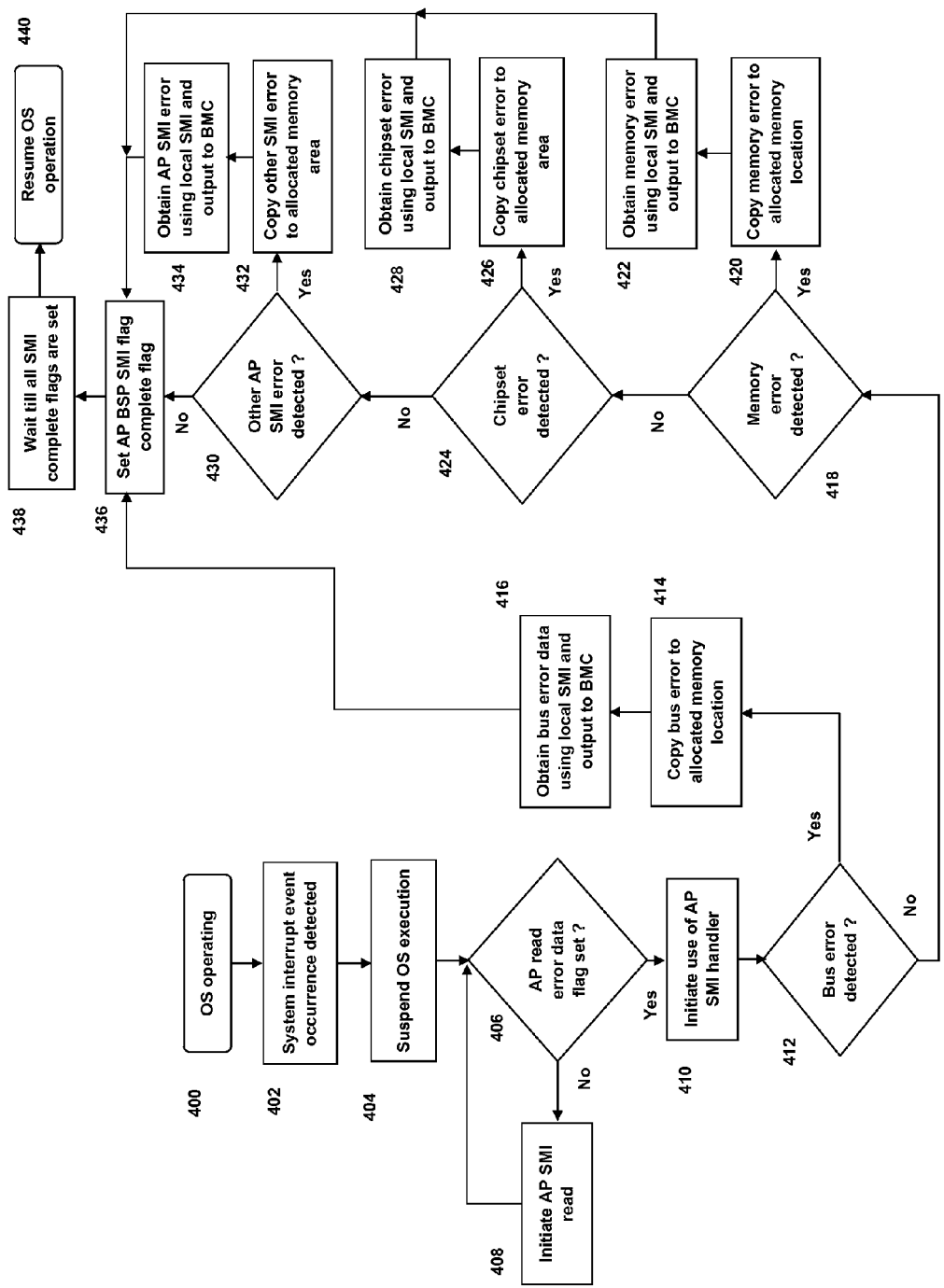
FIG. 4 illustrates a flow diagram of a method of method of obtaining and processing interrupt event data within an information handling system according to one aspect of the disclosure.

FIG. 4 illustrates a flow diagram of a method of method of obtaining and processing interrupt event data within an information handling system according to one aspect of the disclosure. FIG. 4 can be employed in whole, or in part, by the information handling system 100 depicted in FIG. 1, the interrupt handling system 200 described in FIG. 2, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4.

In various forms, the method can be used by a local processor, an application processor, one ore more processor cores, firmware, a device driver, or any combination thereof, operable to handle interrupt events. The method begins generally at block 400, as an operating system of an information handling system operates. At block 402, a SMI event occurrence can be detected.

The method can then proceed to block 404 and execution of the operating system can be suspended. The method can then proceed to block 406, and an application processor SMI read error flag can be accessed to determine if request to read the SMI event messages or data has been set. If the AP SMI read error data flag is not set, the method can proceed to block 408, and initiates an AP SMI read request to the BSP, and repeats at 406.

If at block 406, the AP read error data flag is set, the method can proceed to block 410, and use of an AP SMI handler can be initiated by the AP. The method can then proceed to decision block 412, and determines if bus error can be detected. For example, a communication bus can be scanned to determine if one or more devices or components coupled to the communication bus initiated an SMI event error. If at decision block 412, a bus error is detected, the method can proceed to block 414, and the SMI event error data of one or more device coupled to the communication bus can be copied to an allocated memory location. The method can then proceed to block 416, and the bus data can be output to the BMC. In one form, the bus error SMI event message or data copied to the allocated memory area can be accessed by a local processor, the BMC, an SP or any combination thereof. The method can then proceed to block 436.

If at decision block 412, a bus error is not detected, the method can proceed to decision block 418 and determines if a memory error SMI event has been detected. If a memory error SMI event is detected, the method can proceed to block 420 and the memory error SMI event message or data can be copied to the allocated memory location. The method can then proceed to block 416, and the memory error SMI event data can be output to the BMC. In one form, the memory error SMI event message or data copied to the allocated memory area can be accessed by a local processor, the BMC, an SP or any combination thereof. The method can then proceed to block 436.

If at decision block 418, a memory error is not detected, the method can proceed to decision block 424 and determines if a chipset error is detected. If a chipset error is detected, the method can proceed to block 426 and the chipset error data can be copied to the allocated memory location. The method can then proceed to block 428 and the chipset memory error can be output to the BMC. In one form, the chipset SMI event message or data copied to the allocated memory area can be accessed by a local processor, the BMC, an SP or any combination thereof. The method can then proceed to block 436.

If at decision block 424, a chipset error may not be detected, the method can proceed to block 430 and determines in another SMI event error at the AP has been detected. If another error has been detected, the method can proceed to block 432 and the SMI event error of the AP can be copied to the allocated memory location. The method can then proceed to block 416, and the bus data can be output to the BMC. In one form, the SMI event message or data can be copied to the allocated memory area, and can be accessed by a local processor, the BMC, an SP or any combination thereof. The method can then proceed to block 436.

At block 436, the AP BSP SMI flag indicating that the SP SMI event data read is complete can be set. In one form, the local processor, the BMC, an SP or any combination thereof can detect the SMI read flag as set and can access the allocated memory locations to obtain SMI event messages or data as desired. The method can then proceed to block 438 and waits till each SMI read complete flag may be set. The method can then proceed to block 444 and the operating system can be resumed.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of obtaining error data within an information handling system comprising:
    detecting a first interrupt event occurrence generated by a first remote resource of a plurality of resources of the information handling system using a local processor coupled to a first local memory;
    initiating use of a first system management interrupt handling sequence using the local processor;
    initiating use of a second system management interrupt handling sequence remote to the local processor, wherein the second system management interrupt handling sequence includes:
        initiating parallel access to the plurality of resources to determine whether an interrupt event occurrence was generated at the first resource and at least one other resource;
        when system management interrupt information is detected at any of the first resource and the at least one other resource, copying and storing the system management interrupt information to an allocated memory location of a plurality of allocated memory locations configured to store a plurality of interrupt event messages remote to the local processor;
    enabling access to a first allocated memory location of the plurality of allocated memory locations, wherein at least a portion of the first allocated memory location is updated to include a first interrupt event message related to the first interrupt event occurrence; and
    wherein the second system management interrupt handling sequence updates the first allocated memory location prior to the first system management interrupt handling sequence completing.

2. The method of claim 1, further comprising:
    suspending execution of an operating system in response to detecting the first interrupt event occurrence;
    accessing the first allocated memory location during use of the first system management interrupt handling sequence;

obtaining the first interrupt event message from the first allocated memory location using the first system management interrupt handling sequence; and storing the first interrupt event message within the first local memory of the local processor.

3. The method of claim 1, further comprising:

determining a system topology including a first allocated memory location reference; and accessing the first allocated memory location using the first allocated memory location reference.

4. The method of claim 3, further comprising:

determining a plurality of allocated memory locations using the system topology, wherein the plurality of allocated memory area locations are operable to separately store a plurality of interrupt event messages; and accessing the plurality of allocated memory area locations to determine the plurality of interrupt event messages during use of the first system management interrupt handling sequence.

5. The method of claim 1, further comprising:

determining a second allocated memory location including a second interrupt event message, wherein the second allocated memory location is remotely located to the first allocated memory location;

obtaining the second interrupt event message from the second allocated memory location; and storing the second interrupt event message and the first interrupt event message within the first local memory.

6. The method of claim 1, further comprising:

copying the first interrupt event message from a first interrupt event log to the first allocated memory location;

setting a remote error read complete flag upon copying the first interrupt event message to the first allocated memory location; and reading the remote error read compete flag prior to accessing the first allocated memory location during use of the first system management interrupt handling sequence.

7. The method of claim 1, further comprising:

determining the first interrupt event message using the local processor without requesting the first interrupt event message from a first error log of the first remote resource, wherein the first interrupt event message is obtained using the first system management interrupt handling sequence; and copying the first interrupt event message from the first allocated memory location to the first local memory.

8. The method of claim 1, further comprising obtaining a second interrupt event message in parallel with obtaining the first interrupt event message, the second interrupt event message obtained from a second allocated memory location.

9. The method of claim 1, further comprising:

detecting a chipset interrupt event of an application processor;

copying a chipset interrupt event message operable to identify the chipset interrupt event to the first allocated memory location; and enabling access to the chipset interrupt event message using a management controller coupled to the local processor.

10. The method of claim 1, further comprising:

detecting a device interrupt event of a device;

scanning a communication bus coupled to the device;

identifying the device;

copying a device interrupt event message operable to identify the device interrupt event to the first allocated memory location; and enabling access to the device interrupt event message using a management controller coupled to the local processor.

11. The method of claim 1, further comprising:

detecting a memory device interrupt event;

copying a memory device interrupt event message operable to identify the memory device interrupt event to the first allocated memory location; and enabling access to the memory device event message using a management controller coupled to the local processor.

12. An interrupt handling system comprising:

a first system management interrupt handler that is operable to initiate parallel access to a plurality of resources of the information handling system to determine whether each of the plurality of resources has generated interrupt event information, and that is operable to obtain a first interrupt event message from a first resource of the plurality of resources;

wherein the first resource is operable to generate the first interrupt event message, and wherein the first interrupt event message identifies a first interrupt event occurrence detectable by the first system management interrupt handler; and a memory including a first allocated memory location configured to store the first interrupt event message using the first system management interrupt handler, wherein the first system management interrupt handler is responsive to a second system management interrupt handler request to read the first interrupt event message.

13. The interrupt handling system of claim 12, further comprising:

a plurality of resources operably coupled to a local processor, wherein the local processor is operable to use the first system management interrupt handler; and an application processor operable to use the second system management interrupt handling sequence, the second system management interrupt handler operable to initiate copying the first interrupt error message from at least one of the plurality of resources to the first allocated memory location.

14. The interrupt handling system of claim 12, further comprising:

a communication bus operably coupled to the first resource, wherein the first resource includes a device;

wherein the device is responsive to a scan initiated by the second system management interrupt handler; and wherein the device is operable to output the first interrupt event message in response to the scan request.

15. The interrupt handling system of claim 12, further comprising:

a communication bus operably coupled to a plurality of devices, wherein plurality of devices are responsive to a scan request initiated in response a detection of the first interrupt event occurrence; and wherein the plurality of devices are operable to output available interrupt event messages in response to the scan request.

16. The interrupt handling system of claim 12, further comprising an information handling system including:

a first application processor operably coupled to the first system management interrupt handler, wherein the first application processor is operable to use the second system management interrupt handler; and a local processor operable to use the first system management interrupt handler and a system topology operable to identify the first resource and the allocated memory location.

17. The interrupt handling system of claim 16, further comprising:
a second application processor operable to employ a third system management interrupt handler; and
wherein the second application processor is further operable to store an available interrupt event message in a second allocated memory location to be accessed by the first system interrupt handler.

18. An information handling system comprising:
a first processor operable to initiate an inquiry into a system management interrupt event; and
a remote system management interrupt handler responsive to the first processor and the system management interrupt event, wherein the remote system management interrupt handler is operable to initiate parallel access to a plurality of resources of the information handling system to determine whether a resource of the plurality of resources has generated interrupt event information, and wherein the system management interrupt handler is operable to initiate a remote system management interrupt event inquiry to obtain a first interrupt event message identifying the system management interrupt event.

19. The information handling system of claim 18, further comprising:
a BOIS accessible memory storing a system topology accessible by a system management interrupt handler, wherein the system topology includes a first allocated memory location reference of a first allocated memory location operable to store a system management interrupt event entry; and
a BIOS operably coupled to the first processor, wherein the BIOS is operable to initiate access the first allocated memory location to obtain the first interrupt event message.

20. The information handling system of claim 18, further comprising:
a communication bus including:
a first device operable to generate first device event interrupt message; and
a second device operable to generate a second device interrupt message;
wherein the first device and the second device are responsive to a scan operable to determine a bus interrupt event message;
a chipset operable to generate a chipset event interrupt message; and
a memory operable to generate a memory event interrupt message.

* * * * *